United States Patent
Takizawa (10) Patent No.: US 10,249,223 B2
(45) Date of Patent: Apr. 2, 2019

(54) LIGHT FLUX CONTROLLING MEMBER, LIGHT EMITTING DEVICE AND ILLUMINATION APPARATUS

(71) Applicant: Enplas Corporation, Saitama (JP)

(72) Inventor: Masayo Takizawa, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 611 days.

(21) Appl. No.: 14/824,329

(22) Filed: Aug. 12, 2015

(65) Prior Publication Data

US 2016/0053971 A1 Feb. 25, 2016

(30) Foreign Application Priority Data

Aug. 25, 2014 (JP) ................. 2014-170442

(51) Int. Cl.
  *G02B 27/30* (2006.01)
  *G09F 13/22* (2006.01)
  *G02B 17/08* (2006.01)

(52) U.S. Cl.
  CPC .......... *G09F 13/22* (2013.01); *G02B 17/086* (2013.01); *G02B 27/30* (2013.01)

(58) Field of Classification Search
  CPC .... B60Q 1/143; B60Q 1/12; B60Q 2300/056; B60Q 2300/322; B60Q 2300/41; B60Q 2300/42; B60Q 2300/45; F21S 48/1794
  See application file for complete search history.

(56) References Cited

U.S. PATENT DOCUMENTS

| 2014/0071693 A1* | 3/2014 | Zhang | G02B 19/0028 362/309 |
| 2014/0168996 A1* | 6/2014 | Kajiwara | F21V 5/04 362/311.02 |
| 2015/0124459 A1* | 5/2015 | Zhang | G02B 19/0066 362/308 |

FOREIGN PATENT DOCUMENTS

| JP | 2002-528861 A | 9/2002 |
| JP | 2003-195790 A | 7/2003 |
| WO | 00/24062 A1 | 4/2000 |

* cited by examiner

*Primary Examiner* — Anh T Mai
*Assistant Examiner* — Fatima N Farokhrooz
(74) *Attorney, Agent, or Firm* — Brundidge & Stanger, P.C.

(57) ABSTRACT

A light flux controlling member includes an incidence surface, a reflection surface and an emission surface. The incidence surface includes a top surface and a side surface. The top surface is divided by a first plane into a first top surface and a second top surface. In the cross-section taken along a second plane including the central axis and perpendicular to the first plane, an angle between the tangent to the first top surface and the central axis is larger than an average angle between the tangent to the second top surface and the central axis. The emission surface includes a first emission surface and a second emission surface. In the cross-section taken along the second plane, an average angle between the tangent to the first emission surface and the central axis is smaller than an average angle between the tangent to the second emission surface and the central axis.

3 Claims, 10 Drawing Sheets

LIGHT FLUX CONTROLLING MEMBER, LIGHT EMITTING DEVICE AND ILLUMINATION APPARATUS

CROSS REFERENCE TO RELATED APPLICATIONS

This application is entitled to and claims the benefit of Japanese Patent Application No. 2014-170442, filed on Aug. 25, 2014, the disclosure of which including the specification, drawings and abstract is incorporated herein by reference in its entirety.

TECHNICAL FIELD

The present invention relates to a light flux controlling member configured to control the distribution of light emitted from a light emitting element, a light emitting device and an illumination apparatus which include the light flux controlling member.

BACKGROUND ART

Large-sized commercial signboards with letters and illustrations have been placed for example on top of buildings or beside railroad tracks. These large-sized signboards are placed with an illumination apparatus for illuminating the display surface of the signboard during the night according to the size of the signboard.

Such an illumination apparatus includes a plurality of light emitting devices for illuminating the display surface of a signboard (member to be irradiated). The plurality of light emitting devices illuminate the display surface of the signboard from obliquely above or below (see, e.g., PTLS 1 and 2).

An illumination apparatus disclosed in PTL 1 includes a member to be irradiated and a plurality of lighting apparatuses (light emitting devices) for illuminating the member to be irradiated. The lighting apparatus are disposed at the bottom of the member to be irradiated such that the optical axis of emitted light from the lighting apparatuses is at an angle relative to the member to be irradiated.

An illumination apparatus disclosed in PTL 2 includes a member to be irradiated and an LED module for illuminating the member to be irradiated. The LED module (light emitting device) includes an LED (light emitting element) and a collimator lens (light flux controlling member) disposed over the LED. The collimator lens includes an incidence surface on which light emitted from the LED is incident, a reflection surface for reflecting the light incident on the incidence surface, and an emission surface for emitting the light reflected by the reflection surface toward the outside. The emission surface is formed such that the cross-section thereof is sawtooth-like so that light incident on the incidence surface propagates obliquely upward. The LED module is disposed such that the optical axis of emitted light therefrom is at angle relative to the member to be irradiated.

CITATION LIST

Patent Literature

PTL 1
Japanese Patent Application Laid-Open No. 2003-195790
PTL 2
Japanese Patent Application Laid-Open No. 2002-528861

SUMMARY OF INVENTION

Technical Problem

In the illumination apparatus disclosed in PTL 1, since light of light emitting devices (lighting apparatuses) having general light distribution characteristics irradiates a signboard in an oblique direction, a region closer to the light emitting devices becomes brighter and a region farther from the light emitting devices become darker in the member to be irradiated (signboard). Also in an illumination apparatus disclosed in PTL 2, since light of a light emitting device (LED module) irradiates a member to be irradiated in an oblique direction, a region closer to the light emitting devices becomes brighter and a region farther from the light emitting devices become darker in the member to be irradiated.

An object of the present invention is to provide a light flux controlling member capable of illuminating a member to be irradiated with high uniformity from an area vicinity of to an area far from a light emitting element in the member to be irradiated even when the member to be irradiated is irradiated with light in an oblique direction. Another object of the present invention is to provide a light emitting device and an illumination apparatus which include the light flux controlling member.

Solution to Problem

A light flux controlling member of the present invention configured to control the distribution of light emitted from a light emitting element, the light flux controlling member disposed such that the central axis of the light flux controlling member coincides with the optical axis of the light emitting element, comprises: an incidence surface configured such that light emitted from the light emitting element is incident on the incidence surface, the incidence surface being the inner surface of a recess disposed on a side of the light flux controlling member closer to the light emitting element to intersect with the central axis; a reflection surface configured to reflect part of the light incident on the incidence surface, the reflection surface being disposed to surround the central axis; and an emission surface configured to emit the light incident on the incidence surface, the emission surface being disposed on the opposite side of the light flux controlling member from the incidence surface to intersect with the central axis, wherein, the incidence surface comprises: a top surface in the recess, the top surface being a part of a rotationally symmetrical surface, the rotation axis of the rotationally symmetrical surface being a straight line located on a side near the light emitting element and perpendicularly intersecting with the central axis; and a side surface connecting the outer edge of the top surface with the opening edge of the recess, wherein the top surface is divided by a first plane into a first top surface and a second top surface, the first plane including the central axis and being perpendicular to the rotation axis; and in the cross-section taken along a second plane which includes the central axis and is perpendicular to the first plane, an angle which is the smaller angle of the two angles between the tangent to the first top surface and the central axis, is larger than an average angle which is the smaller average angle of the two average angles between the tangent to the second top surface and the central axis; the emission surface is a part of a rotationally symmetrical surface with the straight line as the rotation axis, and is divided by the first plane into a first emission surface and a second emission surface; wherein in the cross-section taken along the second plane, an average angle which is the smaller average angle of the two average angles between the tangent to the first emission surface and the central axis is smaller than an average angle which is the smaller average angle of the two average angles between the tangent to the second emission surface and the central axis; the first top surface is disposed on the same side of the first plane as the first emission surface; and in the cross-section on the first plane, the intersection point of the tangent to at least one reflection surface and the central axis is disposed between the incidence surface and the rotation axis.

A light emitting device of the present invention includes a light emitting element and the light flux controlling member according to the present invention.

An illumination apparatus according to the present invention includes the light emitting device according to the present invention and a member to be irradiated configured such that light emitted from the light emitting device irradiates the member to be irradiated, wherein the distance from the first emission surface to the member to be irradiated is longer than the distance from the second emission surface.

Advantageous Effects of Invention

According to the present invention, a member to be irradiated can be illuminated with high uniformity from an area vicinity of to an area far from a light emitting element in the member to be irradiated even when a light emitting device (the light emitting element and a light flux controlling member) is disposed such that the central axis thereof is at angle relative to the member to be irradiated.

DESCRIPTION OF EMBODIMENTS

Hereinafter, embodiments of the present invention will be described in detail with reference to the accompanying drawings.

(Configuration of Illumination Apparatus)

Figure 1A:
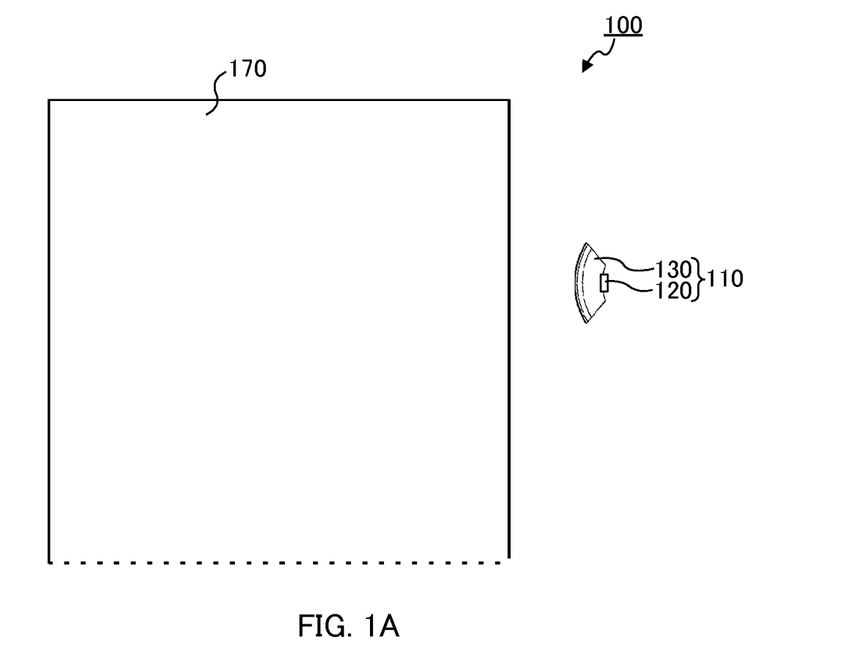
FIGS. 1A and 1B illustrate a configuration of an illumination apparatus according to an embodiment of the present invention.
Figure 1B:
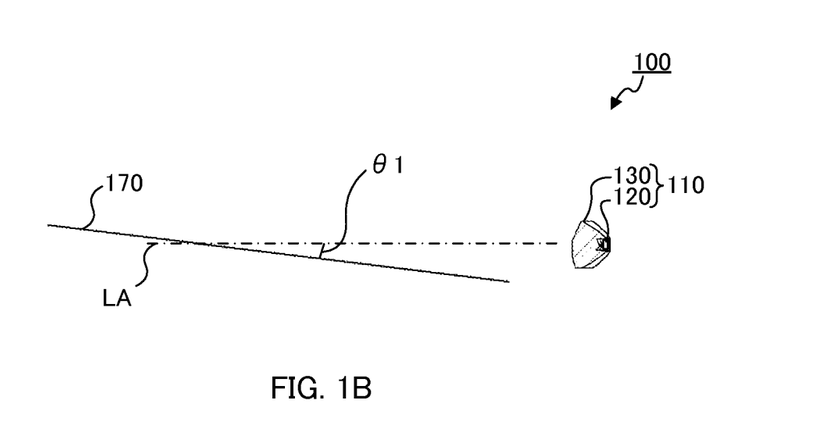

FIGS. 1A and 1B illustrate a configuration of an illumination apparatus according to an embodiment of the present invention. FIG. 1A is a plan view of a half of illumination apparatus 100, and FIG. 1B is a cross-sectional view of illumination apparatus 100.

As shown in FIGS. 1A and 1B, illumination apparatus 100 includes light emitting device 110 and member to be irradiated 170. Light emitting device 110 includes light emitting element 120 and light flux controlling member 130. The display surface (surface to be irradiated) of member to be irradiated 170 is formed as a flat surface.

The number of light emitting devices 110 is not particularly limited. Any number of light emitting devices 110 may be provided according to the size of member to be irradiated 170. As described above, only a half of illumination apparatus 100 is shown in FIG. 1A and therefore the number of light emitting devices 110 is two in the present embodiment.

Each light emitting device 110 is supported by a non-illustrated supporting member so that light emitting device 110 is disposed at a predetermined height from member to be irradiated 170, and the display surface of member to be irradiated 170 and optical axis LA of light emitting element 120 intersect at a predetermined angle. Each light emitting device 110 can be disposed at any height from member to be irradiated 170. Angle θ1 between the display surface of member to be irradiated 170 and optical axis LA is not particularly limited but adjusted to the range from more than 0° to less than 90° to allow the illuminance of member to be irradiated to be highly uniform. In the present embodiment, angle θ1 between the display surface of member to be irradiated 170 and optical axis LA is 7°. Further, light flux controlling member 130 is disposed such that a below-described first emission surface 161 is located on the side opposite to member to be irradiated 170 and second emission surface 164 on the same side as member to be irradiated 170. That is, the distance from first emission surface 161 to member to be irradiated 170 is longer than the distance from second emission 164 to member to be irradiated 170. Furthermore, light flux controlling member 130 is disposed such that a below-described first top surface is located on the side opposite to member to be irradiated 170 and second top surface on the same side as member to be irradiated 170. That is, the distance from first top surface 143 to member to be irradiated 170 is longer than the distance from second top surface 144 to member to be irradiated 170.

Figure 2:
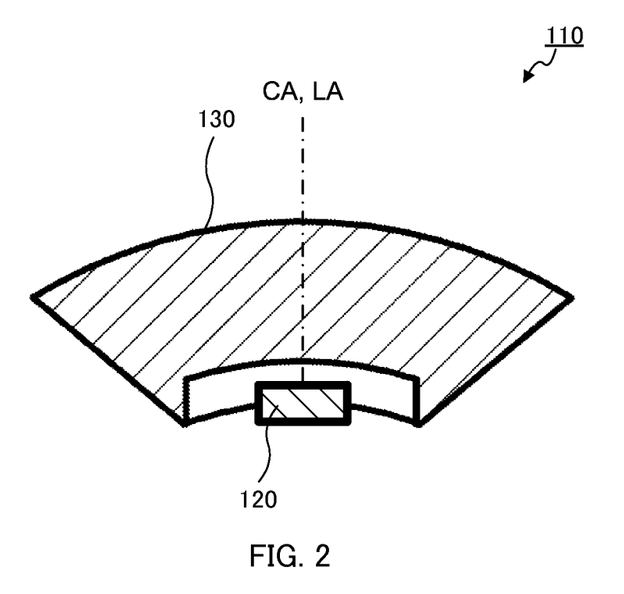
FIG. 2 is a cross-sectional view of a light emitting device.

FIG. 2 is a cross-sectional view of light emitting device 110. As shown in FIG. 2, light emitting device 110 includes light emitting element 120 and light flux controlling member 130. Light emitting element 120 is a light emitting diode (LED) such as a white light emitting diode. Light flux controlling member 130 is configured to control the distribution of light emitted from light emitting element 120. Light flux controlling member 130 is disposed relative to light emitting element 120 such that optical axis LA of light emitting element 120 coincides with central axis CA of light flux controlling member 130. In the present embodiment, the case where only one light emitting element 120 is disposed is shown; however, a plurality of light emitting elements 120 can be disposed relative to one light flux controlling member 130. When a plurality of light emitting elements 120 are disposed, optical axis LA is referred to as the traveling direction of light at the center of a three-dimensional light flux from the light emitting elements.

Figure 3A:
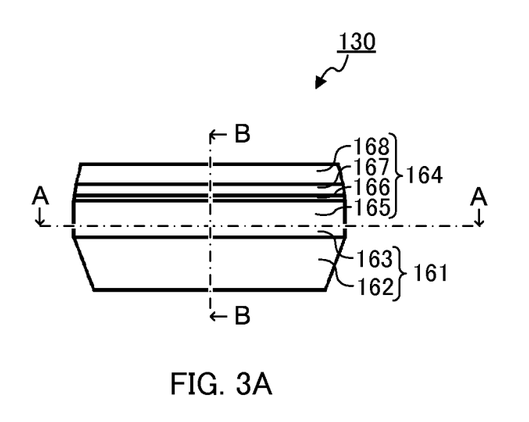
FIGS. 3A to 3D illustrate a configuration of a light flux controlling member.
Figure 3B:
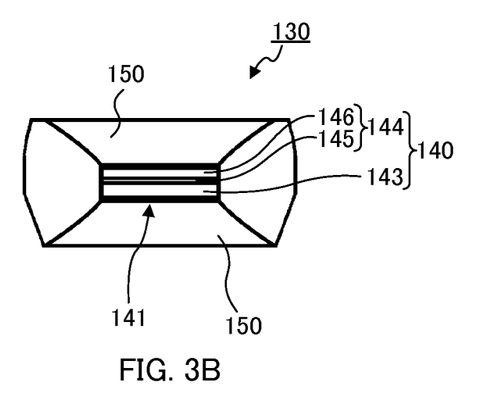
Figure 3C:
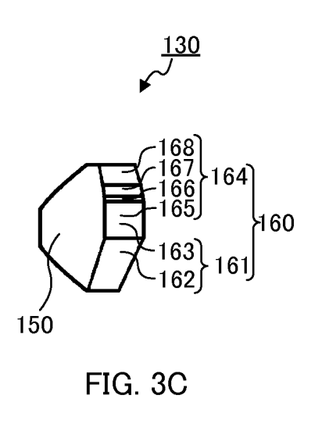
Figure 3D:
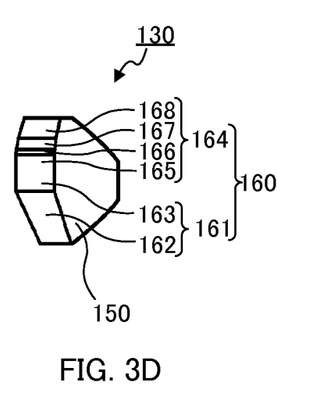
Figure 4A:
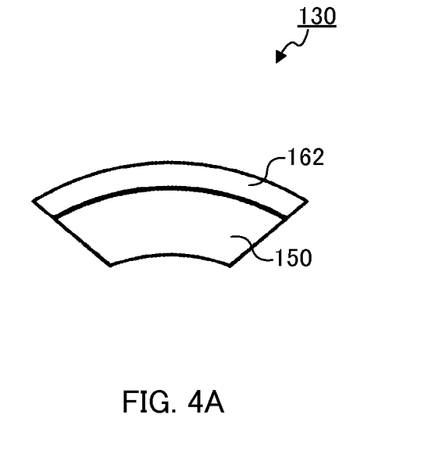
FIGS. 4A to 4D illustrate the configuration of the light flux controlling member.
Figure 4B:
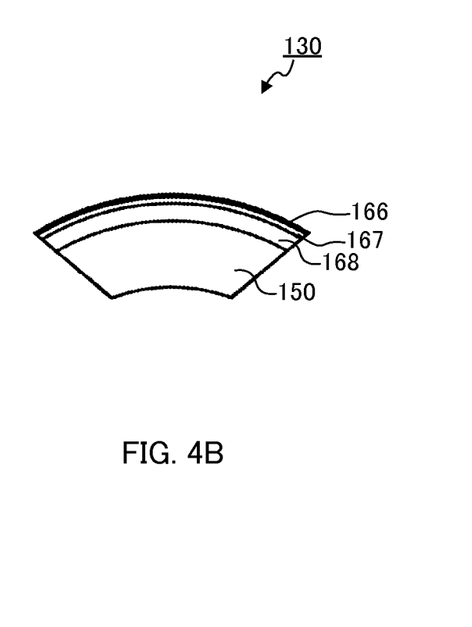
Figure 4C:
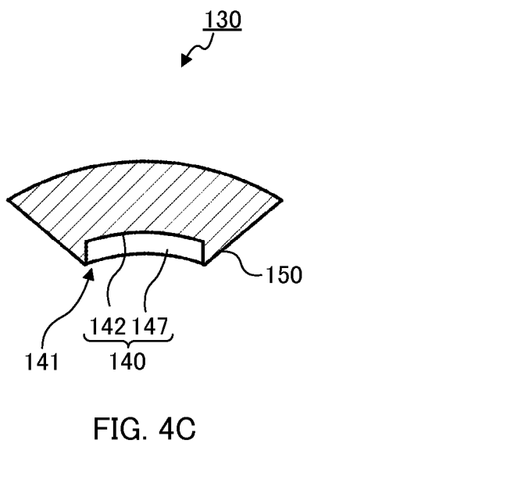
Figure 4D:
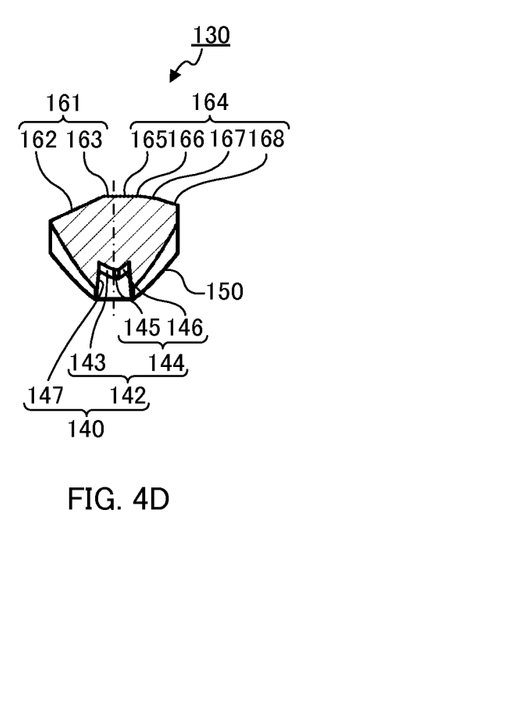
Figure 5A:
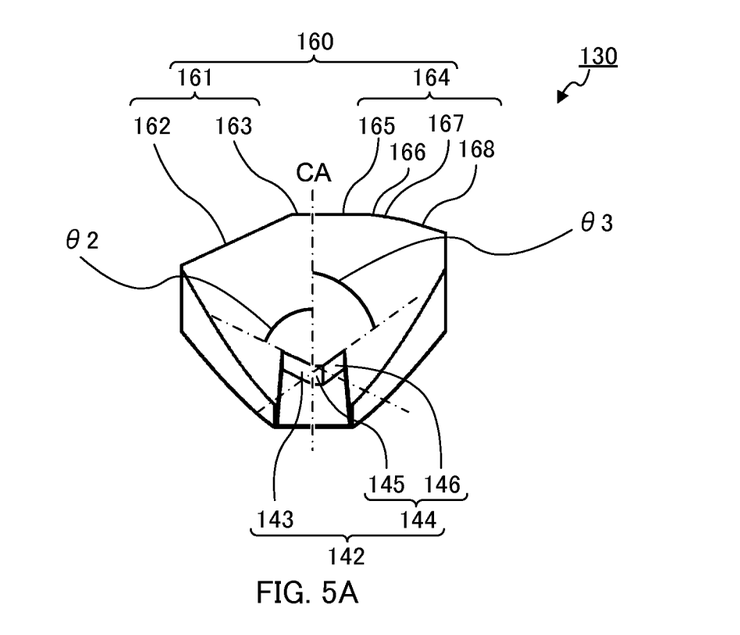
FIGS. 5A and 5B are cross-sectional views of the light flux controlling member.
Figure 5B:
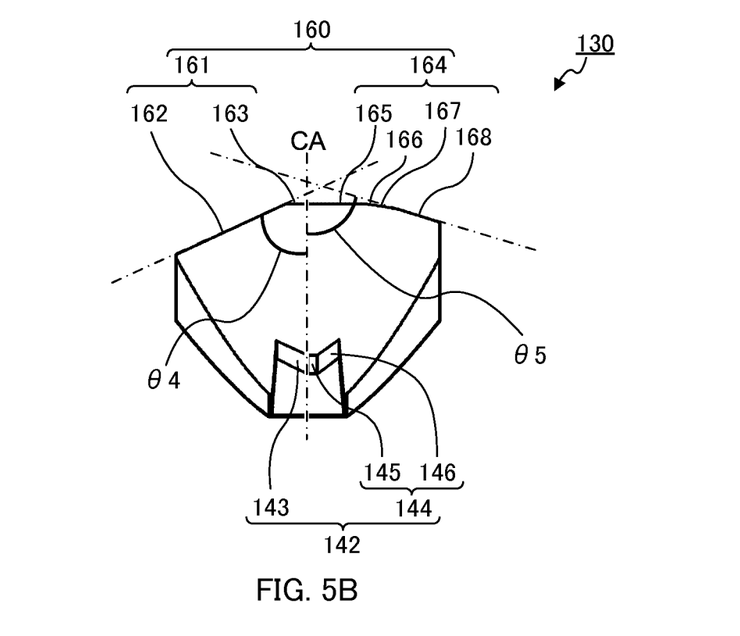

FIGS. 3A to 5B illustrate a configuration of light flux controlling member 130. FIG. 3A is a plan view, FIG. 3B is a bottom view, FIG. 3C is a left side view and FIG. 3D is a right side view of light flux controlling member 130. FIG. 4A is a front view and FIG. 4B is a back view of light flux controlling member 130, and FIGS. 4C and 4D are cross-sectional views taken along line A-A and B-B in FIG. 3A, respectively. FIGS. 5A and 5B are cross-sectional views taken along line B-B in FIG. 3A (the same as FIG. 4D). In FIGS. 5A and 5B, hatching is omitted to show angles.

As shown in FIGS. 3A to 5B, light flux controlling member 130 includes incidence surface 140, reflection surface 150 and emission surface 160. Light flux controlling member 130 is configured to control the distribution of light emitted from light emitting element 120 so that the display surface of member to be irradiated 170 can be illuminated uniformly. Light flux controlling member 130 has a shape which looks like a part of a rotating body with the rotation center thereof located on a side near incidence surface 140 (light emitting element 120 side) compared to emission surface 160. Incidence surface 140 is disposed in a region corresponding to the inner side (center side) of an annular ring, and emission surface 160 is disposed in a region corresponding to the outer side of the annular ring.

Light flux controlling member 130 is formed by integral molding. The material of light flux controlling member 130 is not particularly limited as long as light with desired wavelength can pass through. For example, the material of light flux controlling member 130 is a light-transmissive resin such as polymethylmethacrylate (PMMA), polycarbonate (PC) or epoxy resin (EP), or glass.

Incidence surface 140 allows part of light emitted from light emitting element 120 to enter light flux controlling member 130. In light emitting device 110, incidence surface 140 is the inner surface of recess 141 formed in an area facing light emitting element 120 of light flux controlling member 130. Recess 141 is disposed along the long axis direction of light flux controlling member 130. Incidence surface 140 includes top surface 142 and side surfaces 147. Top surface 142 is disposed to face light emitting element 120. Top surface 142 is divided by a first plane including central axis CA into first top surface 143 and second top surface 144. The first plane is a plane along the rotation direction with the rotation center of light flux controlling member 130 as the rotation center.

First top surface 143 is disposed on the side opposite to member to be irradiated 170. First top surface 143 is a part of a rotationally symmetrical surface. The rotation axis of the first top surface is a straight line located on a side near light emitting element 120 and perpendicularly intersecting with central axis CA. The rotation center of first top surface 143 is the same as the rotation center of light flux controlling member 130. In the cross-section taken along a second plane which includes central axis CA and is perpendicular to the first plane, first top surface 143 may be linear or curved. Further, first top surface 143 may include a plurality of surfaces. Also in this case, in the cross-section taken along the second plane, each surface may be linear or curved. First top surface 143 is disposed on the same side of the first plane as below-described first emission surface 161.

Second top surface 144 is disposed on the same side as member to be irradiated 170. Second top surface 144 is a part of a rotationally symmetrical surface. The rotation axis of the second top surface is a straight line located on a side near light emitting element 120 and perpendicularly intersecting with central axis CA. The rotation center of second top surface 144 is the same as the rotation center of light flux controlling member 130. Second top surface 144 includes first divided top surface 145 and second divided top surface 146. First divided top surface 145 and first top surface 143 are adjacently disposed. Further, first divided top surface 145 and second divided top surface 146 are adjacently disposed. In the cross-section taken along the second plane, each of first divided top surface and second divided top surface 146 may be linear or curved.

As shown in FIG. 5A, in the cross-section take along the second plane, angle θ2 is larger than average angle θ3 wherein angle θ2 is the smaller angle of the two angles between the tangent to first top surface 143 and central axis CA, and average angle θ3 is the smaller average angle of the two average angles between the tangent to second top surface 144 and central axis CA. In the present embodiment, "smaller average angle θ3 of the two average angles between the tangent to second top surface 144 and central axis CA" means the average of the angles between the tangent to first divided top surface 145 and central axis CA; and between the tangent to second divided top surface 146 and central axis CA. Since both first top surface 143 and second top surface 144 each are a part of a rotationally symmetrical surface, in a cross-section taken along any plane which includes the rotation axis, angle θ2 is larger than average angle θ3, wherein angle θ2 is the smaller angle of the two angles between the tangent to first top surface 143 and a straight line that is central axis CA being rotated to the plane including the rotation axis, and average angle θ3 is the smaller average angle of the two average angles between the tangent to second top surface 144 and the straight line that is central axis CA being rotated to the plane including the rotation axis. In this manner, the whole display surface of member to be irradiated 170 can be illuminated by allowing angle θ2 and average angle θ3 to be different. Specifically, the amount of light illuminating a region vicinity of light emitting element 120 in the display surface of member to be irradiated 170 can be suppressed by allowing angle θ2 to be larger than average angle θ3. Further, light that reaches a region far from light emitting element 120 in the display surface of member to be irradiated 170 can be generated by allowing average angle θ3 to be smaller than angle θ2.

Reflection surface 150 is disposed so as to surround recess 141. Reflection surface 150 is configured to totally reflect part of light incident on side surface 147 of incidence surface 140 toward emission surface 160. Reflection surface 150 is a surface extending from the outer edge of the rear surface (the surface located on the side opposite to emission surface 160) where recess 141 is formed to the outer edge of emission surface 160, and preferably a curved surface. Reflection surface 150 includes two first reflection surfaces disposed along the first plane, and two second reflection surfaces disposed along the second plane. Respective first reflection surfaces and second reflection surfaces are formed such that the distance from central axis CA gradually increases from the opening edge of recess 141 toward emission surface 160. Further, the first reflection surface is a part of a rotationally symmetrical surface. The rotation axis of the first reflection surface is a straight line located on a side near light emitting element 120 and perpendicularly intersecting with central axis CA. The rotation center of the first reflection surface is the same as the rotation center of light flux controlling member 130. In the cross-section taken along the first plane, the intersection point of the tangent to at least one reflection surface 150 and central axis CA is disposed between incidence surface 140 and the rotation axis. In this manner, a bright part is not easily generated by light totally reflected by the second reflection surfaces. A flange may be formed between outer edges of reflection surface 150 and emission surface 160.

Emission surface 160 is configured to emit part of light incident on incidence surface 140 and reflected by reflection surface 150, and part of light incident on incidence surface 140. Emission surface is divided by the first plane into first emission surface 161 and second emission surface 164.

First emission surface 161 includes first divided emission surface 162 and second divided emission surface 163. First divided emission surface 162 and second divided emission surface 163 are adjacently disposed. Second divided emission surface 164 includes third divided emission surface 165, fourth divided emission surface 166, fifth divided emission surface 167 and sixth divided emission surface 168. Third divided emission surface 165 and fourth divided emission surface 166 are adjacently disposed. Also, fourth divided emission surface 166 and fifth divided emission surface 167 are adjacently disposed. Further, fifth divided emission surface 167 and sixth divided emission surface 168 are adjacently disposed. Each of first divided emission surface 162, second divided emission surface 163, third divided emission surface 165, fourth divided emission surface 166, fifth divided emission surface 167 and sixth divided emission surface 168 is a part of a rotationally symmetrical surface. The rotation axis of the rotationally symmetrical surface is a straight line located on a side near light emitting element 120 and perpendicularly intersecting with central axis CA.

As shown in FIG. 5B, in the cross-section taken along the second plane, average angle θ4 is smaller than average angle θ5 wherein average angle θ4 is the smaller average angle of the two average angles between the tangent to first emission surface 161 and central axis CA, and average angle θ5 is the smaller average angle of the two average angles between the tangent to second emission surface 164 and central axis CA. In the present embodiment, "smaller average angle θ4 of the two average angles between the tangent to first emission surface 161 and central axis CA" means the average of the angles between the tangent to first divided emission surface 162 and a straight line parallel to central axis CA; and between the tangent to second divided emission surface 163 and the straight line parallel to central axis CA. Further, "smaller average angle θ5 of the two average angles between the tangent to second emission surface 164 and central axis CA" means the average of the angles between the tangent to third divided emission surface 165 and the straight line parallel to central axis CA; the tangent to fourth divided emission surface 166 and the straight line parallel to central axis CA; the tangent to fifth divided emission surface 167 and the straight line parallel to central axis CA; and the tangent to sixth divided emission surface 168 and the straight line parallel to central axis CA. Since both emission surface 161 and second emission surface 164 each are a part of a rotationally symmetrical surface, in a cross-section on any plane which includes the rotation axis, average angle θ4 is smaller than average angle θ5, wherein angle θ4 is the smaller average angle of the two average angles between the tangent to first emission surface 161 and a straight line that is central axis CA being rotated to the plane including the rotation axis, and average angle θ5 is the smaller average angle of the two average angles between the tangent to second emission surface 164 and the straight line that is central axis CA being rotated to the plane including the rotation axis. In this manner described above, light can irradiate a region vicinity of light emitting element 120 in the display surface of member to be irradiated 170 by allowing average angle θ4 to be smaller than average angle θ5. Also, light irradiating the display surface of member to be irradiated 170 can be controlled to have arbitral distribution by changing the angles θ4 and θ5 stepwise according to the distance from central axis CA.

Figure 6A:
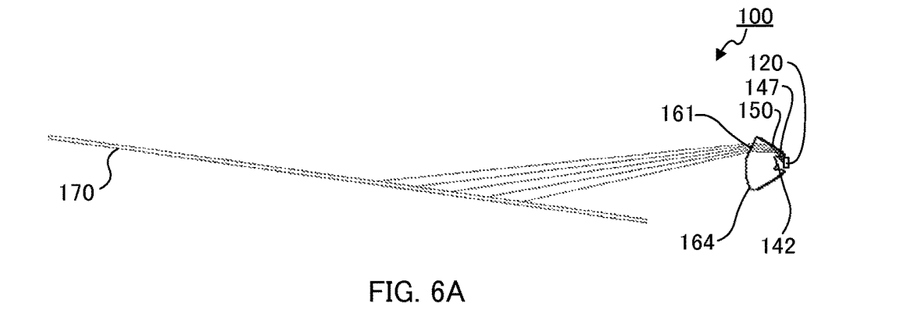
FIGS. 6A to 6C illustrate optical paths in the illumination apparatus.
Figure 6B:
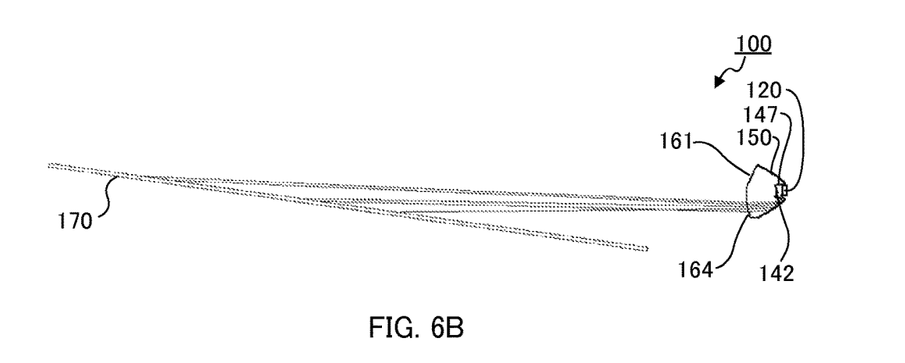
Figure 6C:
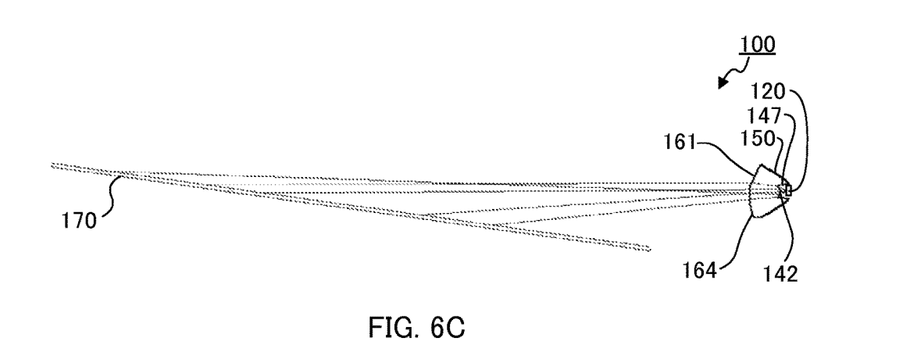

FIGS. 6A to 6C illustrate optical paths in the illumination apparatus in a side view. FIG. 6A illustrates optical paths of light incident on side surface 147 disposed on the side opposite to member to be irradiated 170, reflected by reflection surface 150, and emitted from first emission surface 161. FIG. 6B illustrates optical paths of light incident on side surface 147 disposed on the same side as member to be irradiated 170, reflected by reflection surface 150, and emitted from second emission surface 164. FIG. 6C illustrates optical paths of light incident on top surface 142 and emitted from first emission surface 161 and second emission surface 164 without being reflected by reflection surface 150.

As shown in FIG. 6A, light incident on side surface 147 disposed on the side opposite to member to be irradiated 170, reflected by reflection surface 150, and emitted from first emission surface 161 reaches a region vicinity of light emitting element 120 in the display surface of member to be irradiated 170. As shown in FIG. 6B, light incident on side surface 147 disposed on the same side as member to be irradiated 170, reflected by reflection surface 150, and emitted from second emission surface 164 reaches a region far from light emitting element 120 in the display surface of member to be irradiated 170. Further, as shown in FIG. 6C, light incident on top surface 142 and emitted from emission surface 160 without being reflected by reflection surface 150 reached the whole display surface of member to be irradiated 170.

With respect to illumination apparatus 100 in which light irradiates member to be irradiated 170 in an oblique direction, it is considered to dispose light emitting device 110 such that the optical axis thereof is at angle relative to member to be irradiated 170. In this case, it is considered to add the same function to incidence surface 140 and emission surface 160 which are both in a region on the side opposite to or on the same side as member to be irradiated 170 of light flux controlling member 130 in order to illuminate the display surface of member to be irradiated 170 uniformly. For example, when trying to illuminate a region far from light emitting device 110 in the display surface of member to be irradiated 170 by coordinating incidence surface 140 and emission surface 160, angles of the tangents to incidence surface 140 and emission surface 160 relative to optical axis LA are bound to be made larger in the region of light flux controlling member 130 on the same side as member to be irradiated 170. Further, when trying to illuminate a region vicinity of light emitting device 110 in member to be irradiated 170, angles of the tangents to incidence surface 140 and emission surface 160 relative to optical axis LA are bound to be made smaller in the region of light flux controlling member 130 on the side opposite to member to be irradiated 170. However, in the present embodiment, as described above, in the cross-section taken along the second plane, when angle θ2 is small which is the smaller angle of the two angles between the tangent to first top surface 143 and a straight line parallel to central axis CA, average angle θ4 is large which is the smaller average angle of the two average angles between the tangent to first emission surface 161 and central axis CA. On the other hand, in the cross-section taken along the second plane, when angle θ3 is large which is the smaller angle of the two angles between the tangent to second top surface 144 and a straight line parallel to central axis CA, average angle θ5 is small which is the smaller average angle of the two average angles between the tangent to second emission surface 164 and central axis CA. In the manner described above, in illumination apparatus 100 of the present embodiment, the angles of the tangents to incidence surface 140 and emission surface 160 relative to optical axis LA are adjusted such that when one angle is large, the other is made small, and vice versa.

Hence, it is possible to independently control light incident on incidence surface 140 (side surface 147), reflected by reflection surface 150 and reached emission surface 160; and light incident on incidence surface 140 and reached emission surface 160 without being reflected by reflection surface 150. Specifically, since the above average angle θ4 is small, light incident on side surface 147 disposed on the side opposite to member to be irradiated 170, reflected by reflection surface 150, and emitted from first emission surface 161 is largely refracted toward member to be irradiated 170 side. On the other hand, since the above average angle θ5 is larger than the above average angle θ4, light incident on side surface 147 disposed on the same side as member to be irradiated 170, reflected by reflection surface 150, and emitted from second emission surface 164 is not refracted as largely as the light emitted from first emission surface 161 is, and therefore reaches a region far from light emitting device 110 in the display surface of member to be irradiated 170. Further, since light flux controlling member 130 is formed such that the above angle θ2 and average angle θ3 are different, light incident on incidence surface 140 and emitted from emission surface 160 without being reflected by reflection surface 150 reaches the whole display surface of member to be irradiated 170.

(Distribution Characteristics of Light Emitting Device)

The distribution characteristics were simulated for light emitting device 110 of the present embodiment. Specifically, the relative illuminance in the first plane direction (planar direction) and the second plane direction (perpendicular direction) with the emitting center of light emitting element 120 as a reference was estimated. In the simulation, the illuminance was estimated on a virtual plane at a position with the distance of 1,000 mm from the emitting center of light emitting element 120.

Figure 7:
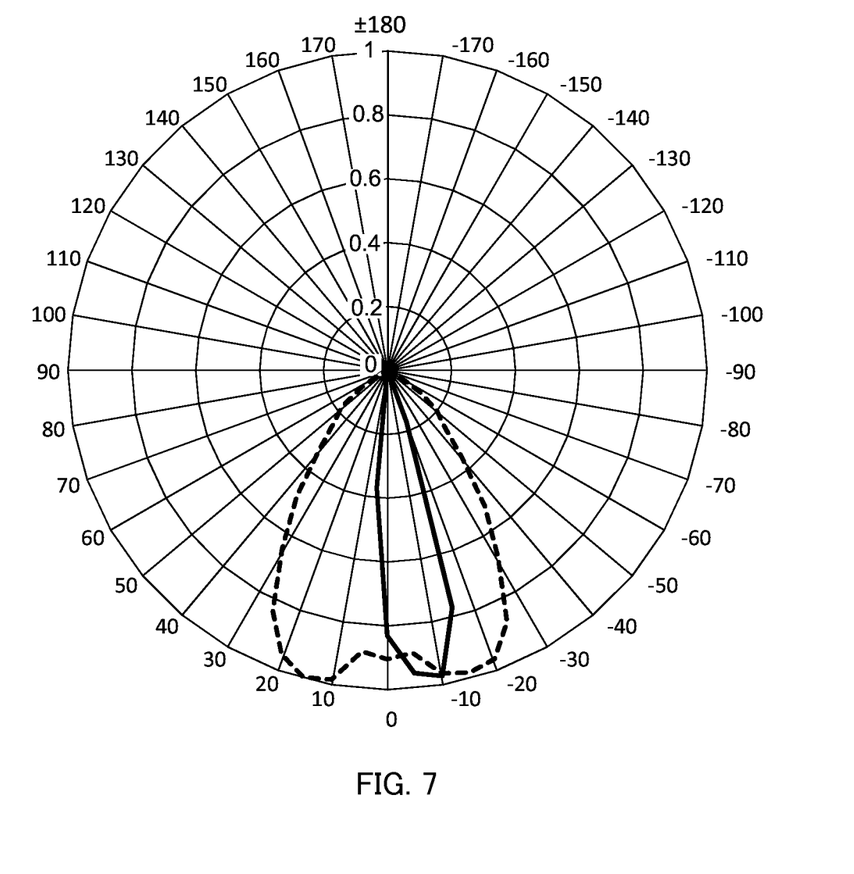
FIG. 7 is a graph of simulation for the distribution characteristics of light incident on a side surface of the light flux controlling member, the side surface being disposed on the side opposite to a member to be irradiated, reflected by a reflection surface, and emitted from a first emission surface.
Figure 8:
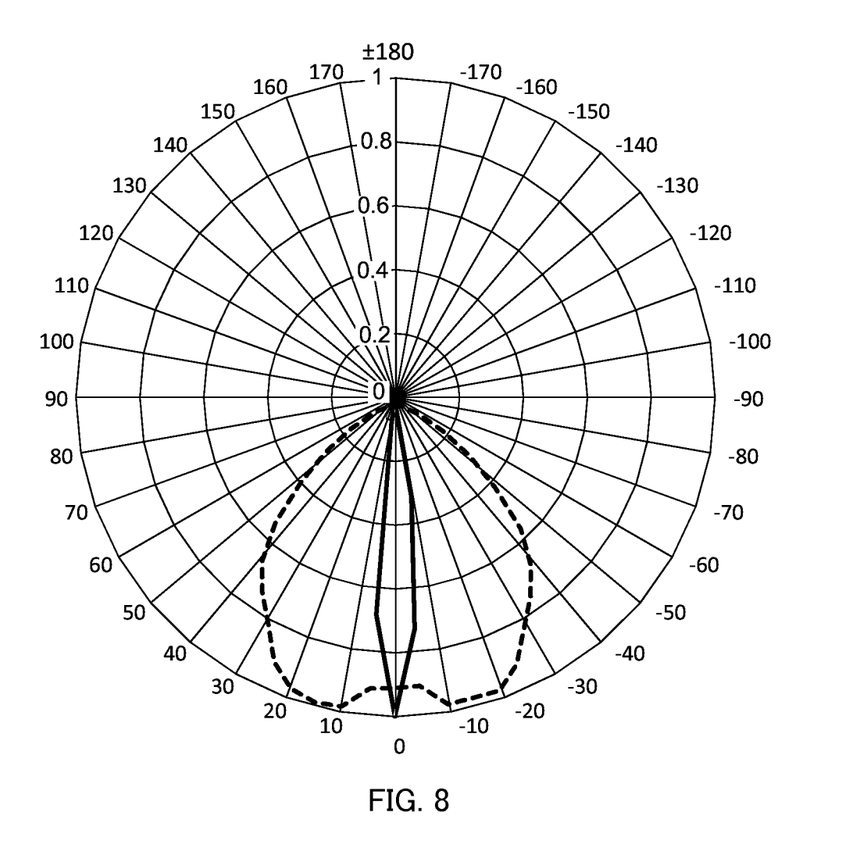
FIG. 8 is a graph of simulation for the distribution characteristics of light incident on a side surface of the light flux controlling member, the side surface being disposed on the same side as the member to be irradiated, reflected by the reflection surface, and emitted from a second emission surface.
Figure 9:
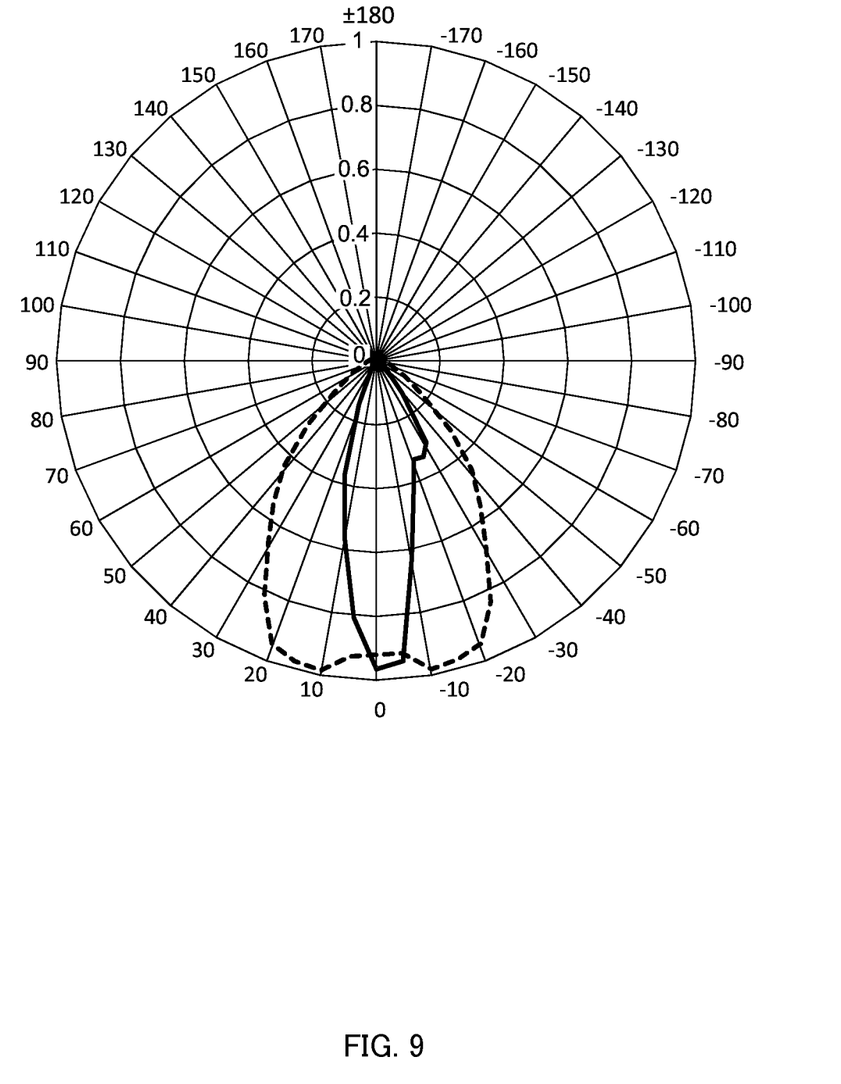
FIG. 9 is a graph of simulation for the distribution characteristics of light incident on a top surface and emitted from the first and second emission surfaces without being reflected by the reflection surface.
Figure 10:
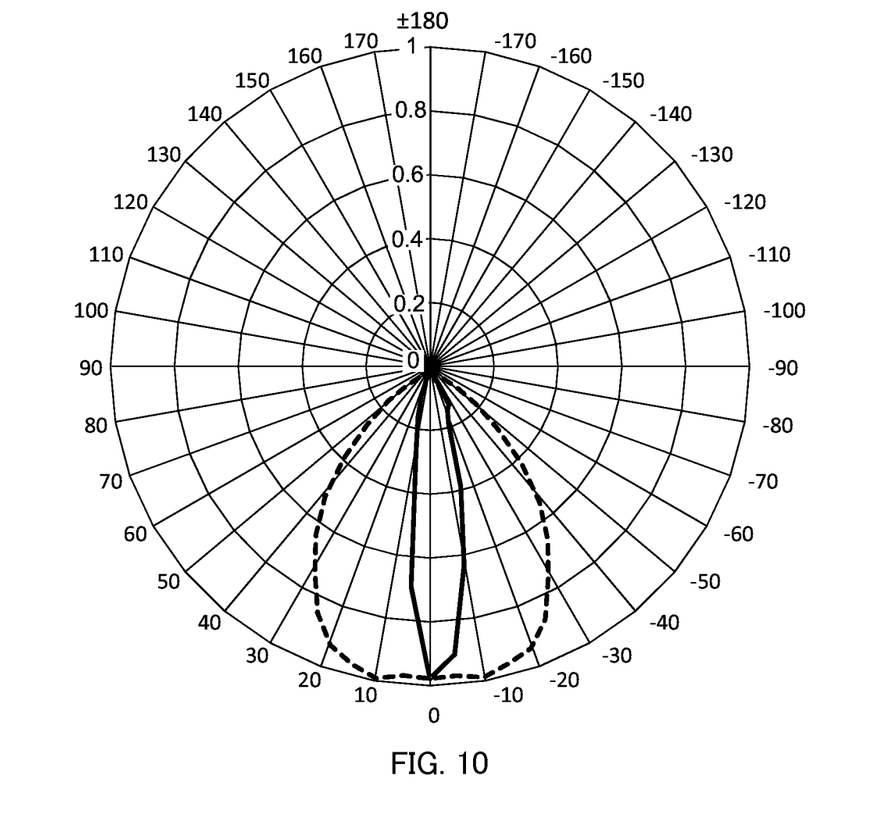
FIG. 10 is a graph of simulation for the light distribution characteristics of the light emitting device according to the embodiment.

FIGS. 7 to 10 are graphs of simulation for the distribution characteristics with respect to light emitting device 110 of the present embodiment. FIG. 7 shows the distribution characteristics of light incident on side surface 147 disposed on the side opposite to member to be irradiated 170, reflected by reflection surface 150, and emitted from first emission surface 161; FIG. 8 shows the distribution characteristics of light incident on side surface 147 disposed on the same side as member to be irradiated 170, reflected by reflection surface 150, and emitted from second emission surface 164; FIG. 9 shows the distribution characteristics of light incident on top surface 142 and emitted from first emission surface 161 and second emission surface 164 without being reflected by reflection surface 150; and FIG. 10 shows the light distribution characteristics of light emitting device 110.

In FIGS. 7 to 10, solid lines show simulation for the distribution characteristics in the second plane direction, and broken lines in the first plane direction. Numbers outside the graphs represent angles relative to optical axis LA (central axis CA) of light emitting element 120. Numbers inside the graphs represent the relative illuminance in each direction (maximum value: 1).

As shown in FIG. 7, light incident on side surface 147 disposed on the side opposite to member to be irradiated 170, reflected by reflection surface 150, and emitted from first emission surface 161 is controlled so as to expand in the first plane direction (broken line in FIG. 7). Further, the light is controlled so as to concentrate to member to be irradiated 170 side in the second plane direction (FIG. 6A and solid line in FIG. 7). In this manner, light emitted from first emission surface 161 irradiates a region vicinity of light emitting element 120 in member to be irradiated 170 as the light expands in the first plane direction.

As shown in FIG. 8, light incident on side surface 147 disposed on the same side as member to be irradiated 170, reflected by reflection surface 150, and emitted from second emission surface 164 is controlled so as to expand in the first plane direction (broken line in FIG. 8). In the first plane direction, it is controlled so that light incident on side surface 147 disposed on the same side as member to be irradiated 170, reflected by reflection surface 150, and emitted from second emission surface 164 expands more than light incident on side surface 147 disposed on the side opposite to member to be irradiated 170, reflected by reflection surface 150, and emitted from first emission surface 161 (broken line in FIG. 7). Further, in the second plane direction, light incident on side surface 147, reflected by reflection surface 150, and emitted from second emission surface 164 is controlled so as not to expand (FIG. 6B and solid line in FIG. 8). In this manner, light emitted from first emission surface 164 irradiates a region far from light emitting element 120 in member to be irradiated 170 as the light expands in the first plane direction.

As shown in FIG. 9, light incident on top surface 142 and emitted from first emission surface 161 and second emission surface 164 without being reflected by reflection surface 150 is controlled so as to expand in the first plane direction (broken line in FIG. 9). Further, in the second plane direction, light incident on top surface 142 and emitted from first emission surface 161 and second emission surface 164 without being reflected by reflection surface 150 (broken line in FIG. 9) is controlled so as to expand more than light incident on side surface 147 disposed on the side opposite to member to be irradiated 170, reflected by reflection surface 150, and emitted from first emission surface 161 (solid line in FIG. 7); or light incident on side surface 147 disposed on the same side as member to be irradiated 170, reflected by reflection surface 150, and emitted from second emission surface 164 (solid line in FIG. 8). In this manner, light incident on top surface 142 and emitted from first emission surface 161 and second emission surface 164 without being reflected by reflection surface 150 irradiates the whole member to be irradiated 170.

(Effect)

Light emitting device 110 of the present embodiment expands light emitted from light emitting element 120 in the first plane direction by first emission surface 161 disposed on the side opposite to member to be irradiated 170 to illuminate a region vicinity of light emitting element 120 in member to be irradiated 170. Also, light emitting device 110 of the present embodiment expands light emitted from light emitting element 120 in the first plane direction by second emission surface 164 disposed on the same side as member to be irradiated 170 to illuminate a region far from light emitting element 120 in member to be irradiated 170. Further, light emitting device 110 of the present embodiment expands light emitted from light emitting element 120 in the second plane direction by first emission surface 161 and second emission surface 164 to illuminate the whole member to be irradiated 170. Furthermore, since emission surface 160 is a part of a rotationally symmetrical surface, light emitted from light emitting element 120 can be expanded uniformly in the first plane direction. In conclusion, light emitting device 110 of the present embodiment can illuminate member to be irradiated 170 from an area vicinity of to an area far from light emitting element 120 with high uniformity because no bright part and dark part is generated in the whole member to be irradiated 170. Also, since emission surface 160 is a part of a rotationally symmetrical surface, a metal mold thereof can be easily manufactured by lathe machining during manufacturing steps.

INDUSTRIAL APPLICABILITY

The light flux controlling member, light emitting device, and illumination apparatus of the present invention can illuminate a member to be irradiated with light emitted from a light emitting element uniformly and efficiently. The light emitting device and illumination apparatus of the present invention are useful as an advertising light for example.

REFERENCE SIGNS LIST

100 illumination apparatus
110 light emitting device
120 light emitting element
130 light flux controlling member
140 incidence surface
141 recess
142 top surface
143 first top surface
144 second top surface
145 first divided top surface
146 second divided top surface
147 side surface
150 reflection surface
160 emission surface
161 first emission surface
162 first divided emission surface
163 second divided emission surface
164 second emission surface
165 third divided emission surface
166 fourth divided emission surface
167 fifth divided emission surface
168 sixth divided emission surface
170 member to be irradiated
CA central axis
LA optical axis

The invention claimed is:

1. A light flux controlling member configured to control a distribution of light emitted from a light emitting element, the light flux controlling member disposed such that a central axis of the light flux controlling member coincides with an optical axis of the light emitting element, the light flux controlling member comprising:

an incidence surface configured such that light emitted from the light emitting element is incident on the incidence surface, the incidence surface being an inner surface of a recess disposed on a side of the light flux controlling member closer to the light emitting element to intersect with the central axis;

a reflection surface configured to reflect part of the light incident on the incidence surface, the reflection surface being disposed to surround the central axis; and an emission surface configured to emit the light incident on the incidence surface, the emission surface being disposed on an opposite side of the light flux controlling member from the incidence surface to intersect with the central axis, wherein the incidence surface comprises:
 a top surface in the recess, and
 a side surface connecting an outer edge of the top surface with an opening edge of the recess;

wherein the top surface is divided by a first plane including the central axis into a first top surface and a second top surface, the second top surface including a first divided top surface and a second divided top surface, the first divided top surface being disposed between the first top surface and the second divided top surface;

wherein the emission surface is divided by the first plane into a first emission surface and a second emission surface, each of the first emission surface and the second emission surface including a plurality of linear segments;

wherein the first top surface and the first emission surface are disposed on a same side with respect to the first plane;

wherein a first angle between the first top surface and central axis is an acute angle and is smaller than a second angle formed between the second divided top surface and the central axis; a third angle between the first emission surface and central axis is an acute angle and is smaller than a fourth angle formed between the second emission surface and the central axis; and wherein the plurality of liner segments of the first emission surface and the second emission surface are different in their linear length.

2. A light emitting device comprising:
a light emitting element; and
the light flux controlling member according to claim 1.

3. An illumination apparatus comprising:
the light emitting device according to claim 2; and
a member to be irradiated configured such that light emitted from the light emitting device irradiates the member to be irradiated,
wherein a distance from the first emission surface to the member to be irradiated is longer than a distance from the second emission to the member to be irradiated.

* * * * *